US012748784B2

(12) United States Patent
Barroca et al.

(10) Patent No.: US 12,748,784 B2
(45) Date of Patent: Sep. 29, 2026

(54) ITERATIVE RESPONSE GENERATION USING GENERATION SCHEMAS

(71) Applicant: Composable Prompts Corp, New York, NY (US)

(72) Inventors: Eric Barroca, Tokyo-to (JP); Bogdan Stefanescu, Paris (FR)

(73) Assignee: Vertesia, Inc., Brooklyn, NY (US)

( * ) Notice: Subject to any disclaimer, the term of this patent is extended or adjusted under 35 U.S.C. 154(b) by 0 days.

(21) Appl. No.: 19/013,323

(22) Filed: Jan. 8, 2025

(65) Prior Publication Data

US 2026/0195352 A1 Jul. 9, 2026

(51) Int. Cl.
*G06F 16/332* (2025.01)
*G06F 40/20* (2020.01)

(52) U.S. Cl.
CPC .......... *G06F 16/3328* (2019.01); *G06F 40/20* (2020.01)

(58) Field of Classification Search
CPC ............................. G06F 16/3328; G06F 40/20
See application file for complete search history.

(56) References Cited

U.S. PATENT DOCUMENTS

| | | | | |
|---|---|---|---|---|
| 7,930,322 | B2 * | 4/2011 | MacLennan | G06F 16/211 707/804 |
| 11,860,914 | B1 * | 1/2024 | Qadrud-Din | G06F 40/289 |
| 11,880,416 | B2 * | 1/2024 | Males | G06F 16/3334 |
| 11,995,411 | B1 * | 5/2024 | Qadrud-Din | G06N 3/045 |
| 12,300,390 | B1 * | 5/2025 | Ziegler | G16H 50/70 |
| 2024/0248934 | A1 * | 7/2024 | Hegardh | G06F 40/274 |
| 2024/0289360 | A1 * | 8/2024 | Chepkwony | G06F 16/3328 |
| 2025/0005523 | A1 * | 1/2025 | Katta | G06F 16/2455 |
| 2025/0238607 | A1 * | 7/2025 | Turner | G06F 40/186 |
| 2025/0284729 | A1 * | 9/2025 | Farnan | G06F 16/35 |
| 2025/0298958 | A1 * | 9/2025 | Mariko | G06F 40/56 |
| 2025/0335699 | A1 * | 10/2025 | Sanderson | G06F 40/295 |
| 2025/0342425 | A1 * | 11/2025 | Faulkner | G06F 21/6218 |

OTHER PUBLICATIONS

Wenxuan Xie et al., "MAG-SQL: Multi-Agent Generative Approach with Soft Schema Linking and Iterative Sub-SQL Refinement for Text-to-SQL", Aug. 16, 2024, pp. 1-22 (Year: 2024).*

(Continued)

*Primary Examiner* — Jared M Bibbee
(74) *Attorney, Agent, or Firm* — Fish & Richardson P.C.

(57) ABSTRACT

Methods, systems, and apparatus, including computer programs encoded on a computer storage medium, for iteratively generating different sections of a textual electronic document ("TED") using one or more large language models (LLMs). In one aspect, a method comprises receiving a request to generate a TED, generating a generation schema of the TED specifying two or more sections of the TED for separate generation, inputting a first set of commands instructing one or more LLMs to generate a first set of text for a first section of the generation schema, inputting a second set of commands including at least a portion of the first set of text and instructing the LLMs to generate a second set of text for a second section of the generation schema, and creating the TED based on an aggregation of the first set of text and the second text according to the generation schema.

20 Claims, 4 Drawing Sheets

(56) References Cited

OTHER PUBLICATIONS

Chen et al., "Contrastive Localized Language-Image Pre-Training," CoRR, Submitted on Oct. 3, 2024, arXiv:2410.02746v1, 20 pages.
Devlin et al., "BERT: Pre-training of Deep Bidirectional Transformers for Language Understanding," CoRR, Submitted on May 24, 2019, arXiv:1810.04805v2, 16 pages.
Dosovitskiy et al., "An Image is Worth 16×16 Words: Transformers for Image Recognition at Scale," CoRR, Submitted on Jun. 3, 2021, arXiv:2010.11929v2, 22 pages.
Radford et al., "Improving Language Understanding by Generative Pre-Training," OpenAI, May 2018, 12 pages (Preprint).
Raffel et al., "Exploring the Limits of Transfer Learning with a Unified Text-to-Text Transformer," CoRR, Submitted on Sep. 19, 2023, arXiv:1910.10683v4, 67 pages.
Ramesh et al., "Zero-Shot Text-to-Image Generation," CoRR, Submitted on Feb. 26, 2021, arXiv:2102.12092v2, 20 pages.

* cited by examiner

ITERATIVE RESPONSE GENERATION USING GENERATION SCHEMAS

BACKGROUND

This specification relates to processing data using machine learning models, and generating long-form content that exceeds the output limit of a large language model.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented, for example, as computer programs on one or more computers in one or more locations that can iteratively generate different sections of a textual electronic document using one or more large language models (LLMs). In this specification, a textual electronic document (TED) refers to an electronic document including data that causes presentation of a set of textual content at a client device. An electronic document (which for brevity can be simply referred to as a document) does not necessarily correspond to a file. That is, a document may be stored in a portion of a file that holds other documents, in a single file dedicated to the document in question, or in multiple coordinated files.

In particular, the system is connected between a client device and one or more large language models (LLMs) that are each configured to process prompts, e.g., directive instructions, and are associated with an output size limit. In some cases, the prompts relate to a context, e.g., supporting data provided to aid the model in responding to the prompt. In this case, the system of this specification can generate a generation schema that defines a number of sections of the textual electronic document, and can include the generation schema and any previously generated sections of the textual electronic document in the context of an input to the LLMs to generate a next section of the textual electronic document. More specifically, the system of this specification can facilitate the iterative generation of each section or subsection of the textual electronic document in accordance with the output size limit of the LLM, e.g., a length defining the number of output tokens that a particular LLM can generate.

According to a first aspect there is provided a method for receiving, by a system that is connected between a client device and one or more large language models (LLMs), a request to generate a textual electronic document ("TED") from a client device, generating, based on the request, a generation schema of the TED, wherein the generation schema specifies two or more sections of the TED that will be separately generated, inputting, by the system and to the one or more LLMs, a first set of data including (i) the generation schema, (ii) data from the request, and (iii) a first set of commands instructing the one or more LLMs to generate a first set of text for a first section of the generation schema of the TED based on the first set of data, obtaining, by the system and from the one or more LLMs, a first response to the first set of data, wherein the first response includes the first set of text generated for the first section of the generation schema of the TED, creating, by the system, a second set of data including (i) the generation schema, (ii) the data from the request, (iii) at least a portion of the first set of text generated for the first section of the generation schema, and (iv) a second set of commands instructing the one or more LLMs to generate a second set of text for a second section of the generation schema of the TED based on the second set of data, submitting, by the system, the second set of data to the one or more LLMs, obtaining, by the system, a second response to the second set of data, wherein the second response includes the second set of text generated for the second section of the generation schema of the TED, creating, by the system, the TED based on an aggregation of the first set of text and the second text according to the generation schema, and providing, by the system, a graphical representation of the TED to the client device in response to the request.

In an example implementation, the method further includes caching a first state of the TED generation after obtaining the first response, wherein the cached state of the TED includes at least the first set of text, and maintaining the cached first state of the TED generation in data storage.

In an example implementation, the method further includes receiving an indication of a failed execution of the one or more LLMs during processing of the second set of data, in response to the indication of failed execution, retrieving the cached first state of the TED generation from the data storage, and submitting, by the system, the cached first state of the TED generation to the one or more LLMs.

In an example implementation, the method further includes generating, for one of the sections among the two or more sections, two or more subsections, creating a set of commands for generating a particular subsection among the two or more subsections based on a context for the particular subsection, wherein the context for the particular subsection includes one or more previously generated subsections in the particular subsection, submitting the set of commands to the one or more LLMs, and obtaining, from the one or more LLMs, text of the particular subsection generated based on the set of commands.

In an example implementation, the method further includes providing the first set of text to the client device, obtaining feedback for the first set of text from the client device, and determining whether to regenerate the first set of text in accordance with the feedback for the first set of text from the client device.

In an example implementation, obtaining the first response to the first set of data includes receiving different responses from each LLM among two or more LLMs, and selecting, as the first response, a particular response from the different responses in accordance with criteria for the first section.

In an example implementation, the criteria for the first section are specified by input from the client device.

In an example implementation, the method further includes selecting, for the first section, a particular LLM as a target LLM for generating the first set of text of the first section based on the first set of commands, wherein the particular LLM has been finetuned in accordance with a specific task.

In an example implementation, generating the generation schema of the TED includes submitting an input comprising information from the request to an LLM with an instruction to generate an outline of the sections of the TED based on the request.

In an example implementation, the input further includes a set of one or more example requests and corresponding TED generation schemas.

In another aspect, there is provided a system comprising one or more computers and one or more storage devices storing instructions that are operable, when executed by the one or more computers, to cause the one or more computers to perform the method of any one of the example implementation methods described.

In another aspect, there is provided a computer storage medium encoded with a computer program, the program comprising instructions that are operable, when executed by data processing apparatus, to cause the data processing apparatus to perform the method of any one of the example implementation methods described.

Particular embodiments of the subject matter described in this specification can be implemented so as to realize one or more of the following advantages.

The system of this specification provides for the iterative generation of a textual electronic document (TED) using a generation schema. A technical problem overcome by the solutions presented in this specification is the problem of how to effectively and accurately use machine learning models to generate long-form textual electronic documents that are larger (e.g., have more tokens) than the machine learning models are capable of generating in a single output. This problem is solved, for example, by generating the generation schema as an outline of each section or subsection of the TED and consecutively executing a set of commands for each section or subsection in accordance with the generation schema, such that each section/subsection generated is within the output size constraints of the machine learning models.

Additionally, by iteratively generating the TED according to the generation schema, the system can increase the accuracy and quality, especially of a long-form textual electronic document generated using a large language model (LLM). Even with an LLM that could accommodate a sufficient number of output tokens to generate the textual electronic document in a single processing generation, the output would generally suffer from overgeneralization, repeated content, or both. In contrast, the system of this specification provides for the focused generation of each section or subsection of the TED in a number of iterative processing iterations using one or more LLMs. In addition, by submitting a set of commands and the generation schema as an input to the one or more LLMs with an instruction to generate the section or subsection based on the generation schema, the system does not need to finetune the LLM used for the response, thereby reducing the use of computational resources relative to training or finetuning a number of LLMs for TED generation.

Because LLMs have either no understanding, or a limited understanding, of their output limits and how to fit an output into the output limit, attempts to create long-form textual content using an LLM can result in the LLM text generation abruptly stopping before the long-form content has been fully generated, or an over-summarization as the output, resulting in an inaccurate output, which is a waste of computing resources. In contrast, the system of this specification can base the generation of each section or subsection off of the roadmap provided by the generation schema, thereby resulting in more detailed, less general text. In particular, the system can submit more targeted instructions in a set of commands for a specific section or subsection, e.g., with respect to a set of commands specifying the generation of a whole TED, to an LLM as part of generating the TED iteratively using the generation schema.

Furthermore, since LLMs are stateless and are unaware of prior inputs and prior responses without reprocessing any content that was provided in a previous input, using the generation schema to guide the long-form content generation also improves the operation of the system and prevents issues that could arise if the state of the content generation were not separately tracked using the generation schema. More specifically, the generation schema provides a roadmap that outlines the operations that need to be performed for each section of the TED. The system can cache different TED states after each generation iteration, e.g., corresponding with a different portion of the generation schema, and can use the generation schema to determine which prior TED state should be included as the context for a next generation iteration, thereby overcoming the problem of statelessness in LLM response generation for long-form content. In particular, by including previously cached TED states as context in inputs submitted to an LLM, the system can streamline the generation of the TED according to the generation schema.

Moreover, by generating the TED iteratively and caching and maintaining TED states after each generation iteration, the system is not required to regenerate the whole TED from the beginning in the case of a missed or incorrectly generated section or subsection. For example, the system can include a maintained previous TED state as context in a re-execution of an input for a particular section or subsection of the TED, thereby reducing the use of computational resources relative to an approach that does not cache TED states for potential re-use for revisions or failed execution. The system can establish a feedback loop that allows for intermediate modification, or regeneration of a failed execution section or subsection, in order to generate a complete TED in a single processing flow of iterative generation, e.g., as opposed to generating the entire TED and having to re-execute the TED from the beginning. In particular, the system can facilitate the input of feedback at each generation iteration for tailored section or subsection re-generation as well as for re-execution of a failed section or subsection, thereby precluding the need to regenerate the whole TED from the beginning after receiving overall feedback at the end of the content generation process.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
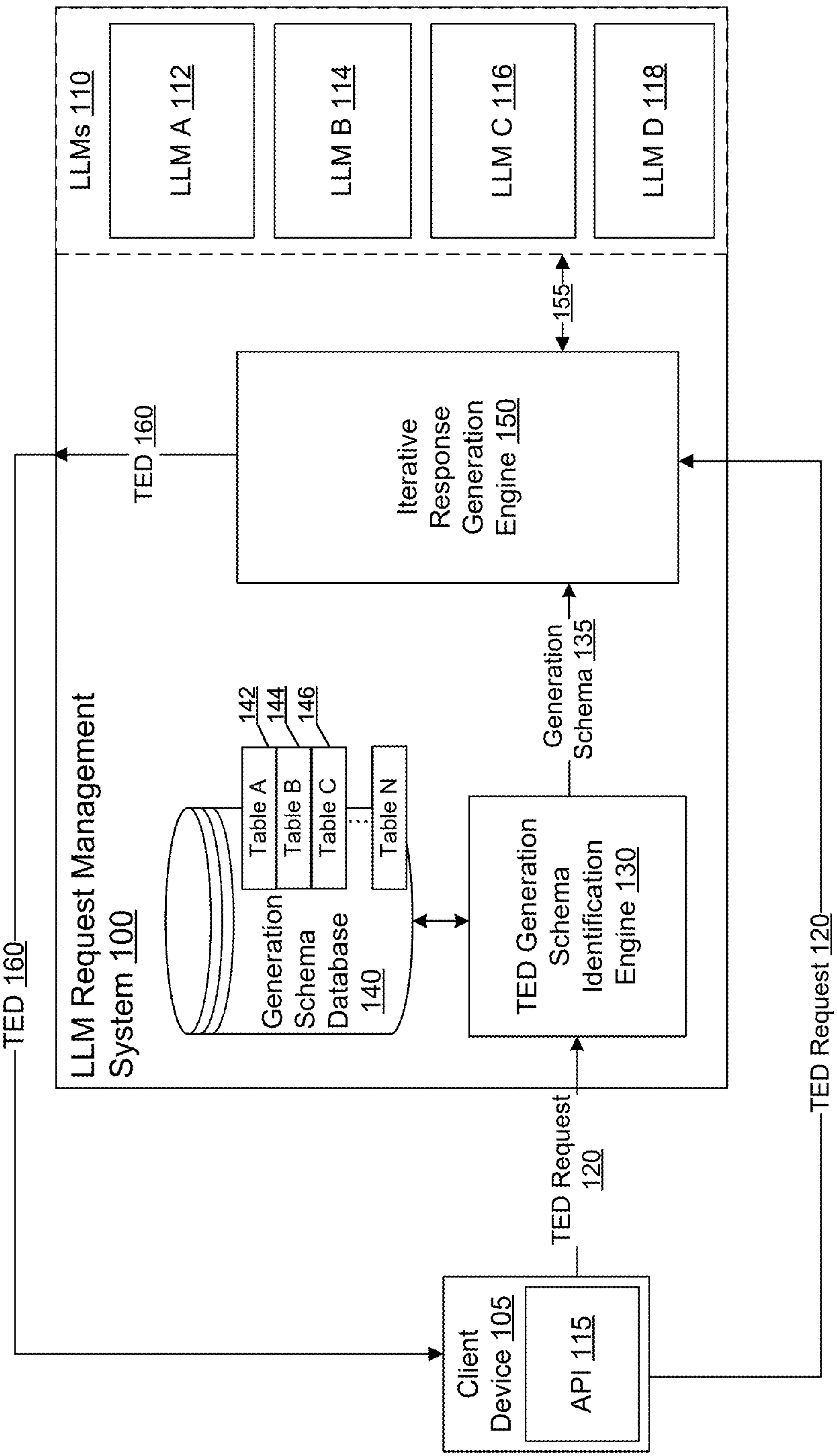
FIG. 1 is a system diagram of an example large language model (LLM) request management system.

FIG. 1 shows an example LLM request management system 100. The LLM request management system 100 is an example of a system implemented as computer programs on one or more computers in one or more locations in which the systems, components, and techniques described below are implemented.

The LLM request management system 100 can connect a client device 105 and one or more large language models (LLMs) 110. The LLMs 110 are depicted in dashed lines since the LLMs are optionally included and managed by the system 100. In other cases, the LLMs 110 are external to the system 100. For example, any or all of the one or more external LLMs can be commercially available LLMs that are developed by third parties that differ from the entity providing the system 100.

In particular, the system 100 can receive a request 120 to generate a textual electronic document (TED) from the client device 105. As an example, the client device 105 can be a server, a laptop, a tablet computer, a desktop, or a mobile device. As another example, the client device 105 can be a wearable device, e.g., a smart-watch, or an internet of things (IOT) device. For example, the system 100 can receive a request 120 and from the client device 105, e.g., by way of an applied programming interface (API) 115. In particular, the API 115 can enable a user, e.g., the user of the client device 105, to input requests to the system for processing using an LLM. As an example, the API 115 can be provided to the user over a network, e.g., the internet.

In this specification, a textual electronic document (TED) refers to an electronic document including data that causes presentation of a set of textual content at a client device. An electronic document does not necessarily correspond to a file. That is, a document may be stored in a portion of a file that holds other documents, in a single file dedicated to the document in question, or in multiple coordinated files. For example, the textual electronic document can be a long-form text file, e.g., a contract, brief, or court case filing. As another example, the textual electronic document can be an essay, technical documentation, an annual report, or a script.

The system can generate a TED generation schema 135 based on the TED request 120 that specifies the different sections of the TED, and can provide for the configuration of consecutive inputs 155 to at least one of the one or more LLMs 110 in order to generate the TED according to the generation schema 135 using an iterative response generation subsystem 150. In particular, the generation schema 135 can provide a roadmap that outlines the operations that need to be performed for each section of the TED, as will be described in more detail below.

Each LLM in the LLMs 110, e.g., LLM A 112, LLM B 114, LLM C 116, and LLM D 118, can have a recurrent neural network architecture that is configured to sequentially process the contents of an input, e.g., a prompt, and trained to perform next element prediction, e.g., to define a likelihood score distribution over a set of next elements. More specifically, each LLM can be a transformer-based model, e.g., an encoder-decoder transformer, an encoder-only transformer, or a decoder-only transformer, that is configured to perform parallel processing of the contents of the multimodal input using a multi-headed attention mechanism. In particular, each large language model can be configured to process a sequence of input tokens and to predict a sequence of output tokens using a likelihood score distribution over a set of next elements based on the previously predicted output tokens.

In particular, the LLMs 110 can be implemented with the same neural network architecture or with different neural network architectures. For example, LLM A 112 and LLM B 114 can be implemented with a first architecture, e.g., a Generative Pretrained Transformer (GPT) architecture, LLM C 112 can be implemented with a second architecture, e.g., a Text-to-Text Transfer Transformer (T5) architecture, and LLM D 118 can be implemented with a third architecture, e.g., a Bidirectional Encoder Representations from Transformer (BERT). As another example, a subset of the LLMs in the external LLMs 110 can have been finetuned from a foundational model for particular tasks in a mixture-of-experts model.

In some cases, one or more of the LLMs 110 are multimodal LLMs, e.g., that are configured to process one or more of a text modality, an image modality, an audio modality, or a video modality. For example, the external LLMs 110 can include a vision transformer, a contrastive language-image pretraining (CLIP) model, or a DALL-E model.

More specifically, the system 100 can create consecutive inputs 155 to one or more of the external LLMs 110 based on the TED request 120 in accordance with the output size limit of the external LLMs 110. In particular, the output size limit constrains the length of the content that each LLM can generate. The output size limit depends on the architecture of the LLM and the length of the input processed as context. As an example, the output size limit can be several hundred tokens, e.g., 126, 512, 748, or several thousand tokens, e.g., 1000, 4000, 8000. As another example, in some cases, the output size limit can be in the tens of thousands of tokens. More specifically, the system 100 can determine an execution strategy by generating a TED generation schema 135 that provides a roadmap for the textual electronic document generation. For example, the TED generation schema 135 can be a table-of-contents, or equivalent, that specifies an outline for different sections and sub-sections of the TED that each that comply with the output size limit of the external LLMs 110.

In this case, the system 100 can process the TED request 120 using a TED generation schema identification engine 130. For example, the system 100 can process information from the TED request 120 using an LLM included in the TED generation schema identification engine 130 with an instruction to generate an outline including two or more sections and, for each section, any number of subsections for the TED specified by the request 120. In some cases, the instruction can additionally include examples to guide the generation of the TED generation schema using examples. In particular, the system can process pairings of example requests and corresponding generation schemas for the example requests as context for the TED request 120 to facilitate the generation of relevant generation schema. Additionally, the engine 130 can generate a TED schema identifier for the generation schema 135, e.g., to facilitate the identification of the TED generation schema 135 in a data storage location.

In the particular example depicted, the system 100 can then maintain the TED generation schema 135 and associated data in a generation schema database 140. As an example, the generation schema database 140 can include structured data, e.g., table A 142, table B 144, table C 146, etc. that correspond with different textual electronic document types. For example, the tables 142, 144, and 146 can be a legal contract table, a short story table, and a documentation table, respectively.

Each table in the database 140 can be indexed using the TED schema identifier generated by the TED generation schema identification engine 130. In particular, in response to a TED request 120 that pertains to a similar type of document, the system 100 can use the TED generation schema identifier to identify relevant example request and corresponding TED generation schema pairings from the database 140. As an example, the system 100 can then include the examples as context with the TED request 120 in the input to the LLM to generate the generation schema 135.

The system 100 can then process the generation schema 135 and the TED request 120 using an iterative response generation subsystem 150 to determine the execution strategy for the TED using two or more consecutive inputs 155. In particular, the system 100 can create each input in accordance with the outline provided for a single section, or, in some cases, sub-section of the generation schema 135. The system 100 can determine one or more prompt(s) in a set of commands that include directive instructions for generating the section or subsection corresponding with the input and can include the prompt(s), the generation schema 135, and any previously generated sections or subsections within the section as context in the input to the LLM. The system 100 can then submit the input to at least one of the LLMs 110.

More specifically, at each iteration of a portion, e.g., a section or sub-section, of the generation schema 135, the iterative response generation subsystem 150 can create a next input in the consecutive inputs 155 for a next section or sub-section by aggregating and including the set of text that was generated in a previous iteration as output as context. In particular, the subsystem 150 can obtain the response from the one or more LLMs 110 and can append the text to the text generated for any previous inputs. In some cases, the context for a sub-section can be restricted to only include the previously generated text for the sub-section, e.g., as opposed to any prior sections. An example iterative response generation subsystem 150 will be described in more detail with respect to FIG. 2.

After submitting the last input in the consecutive inputs 155 to the LLMs 110 and receiving and aggregating the output, the system 100 can provide the generated TED 220 to the client device 105. For example, the system 100 can provide data representing the TED 220 to the client device 105 for display, e.g., as a graphical representation of the TED 220.

In some cases, the system 200 can configure the API 115 to facilitate the providing of feedback to the system regarding the TED 220. In particular, the system 100 can provide each completed section of the TED 220 to the client device 105 for feedback by way of the API 115 as the iterative response generation subsystem 150 creates and submits the consecutive inputs 155 to one or more of the LLMs 110. In this case, a user of the client device 105 can provide feedback to the system 100 that can be submitted as input to the LLMs 110, e.g., to request revision of the section or sub-section, before generating the next section or sub-section, e.g., as will be described in more detail with respect to FIG. 2.

Figure 2:
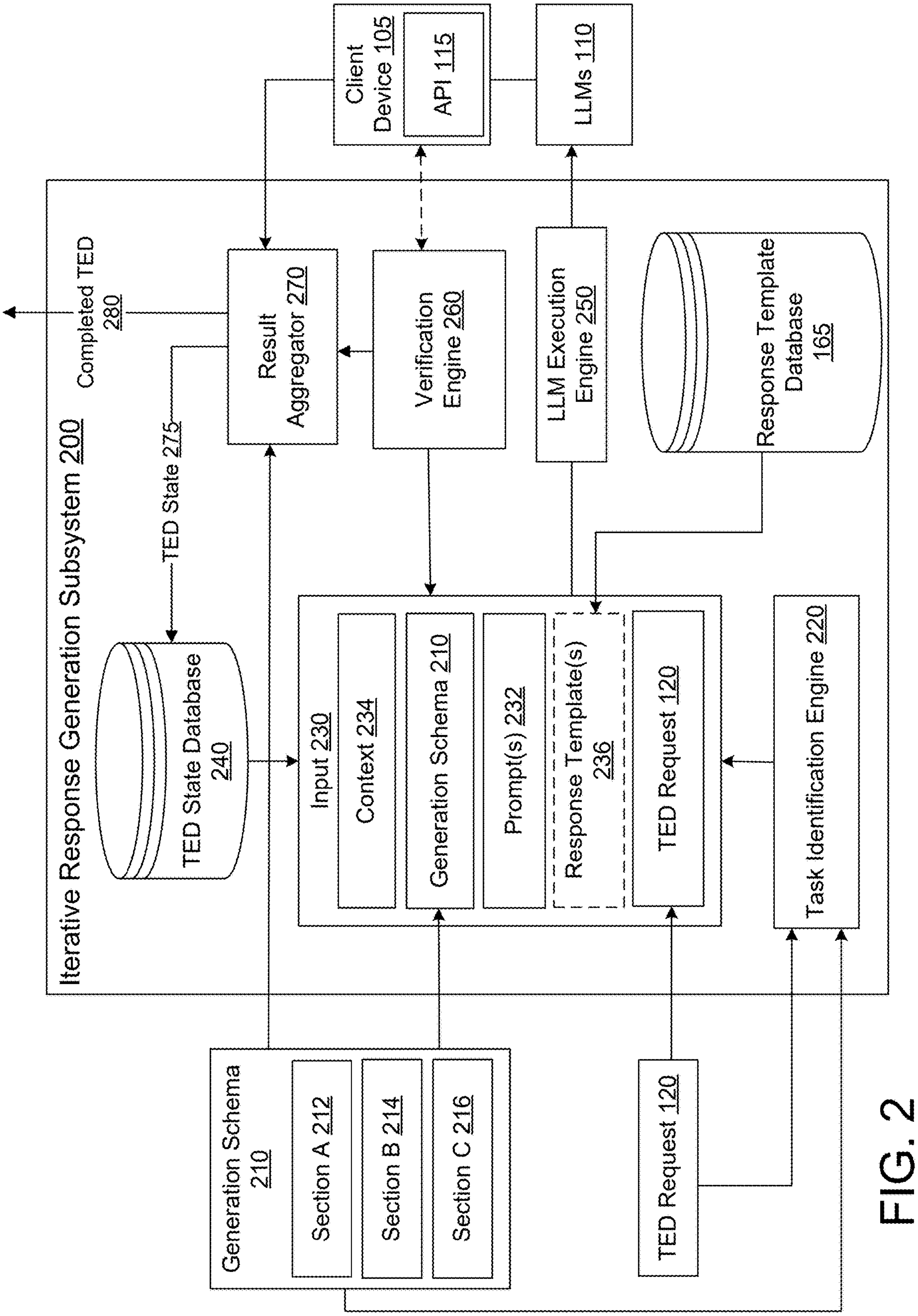
FIG. 2 is a system diagram of an example iterative response generation subsystem.

FIG. 2 is a system diagram of an example iterative response generation subsystem 200. For example, the iterative response generation subsystem 150 of the LLM request management system 100 of FIG. 1 can be implemented as the example iterative response generation subsystem 200.

As described with respect to FIG. 1, the iterative response generation subsystem 200 can receive a TED request 120 to generate a textual electronic document (TED) and a generation schema 210 specifying two or more sections of the TED. In the particular example depicted, the generation schema 210 has three sections, e.g., section A 212, section B 214, and section C 216. While not depicted, each of the sections 212, 214, and 216 can have any number of subsections.

As an example, in the case of a TED request 120 to generate an academic essay, section A 212 can be an introduction section, e.g., including a thesis subsection, section B 214 can be the support section, and section C 216 can be the conclusion section. As another example, in the case of a TED request to generate a legal memorandum for a case that relates to a particular statute, section A 212 can be an introduction section, e.g., including brief answer and fact sub-sections, section B 214 can be an analysis section with sub-sections corresponding with each element of the particular statute, and section C 216 can be a conclusion section.

In particular, the subsystem 200 can determine an execution strategy to execute the TED request 120 based on the generation schema 210 using one or more of the LLMs 110. More specifically, the subsystem 200 can determine one or more prompt(s) 232 in a set of commands from the TED request 120 for each of the sections 212, 214, and 216 of the generation schema 210. In particular, each prompt can be an instruction regarding the generation of the section. In some cases, the subsystem 200 can additionally include response templates 236 as example output formatting for the LLMs 110 for the section.

In particular, the system 100 can process the TED request 120 and the generation schema 210 to determine one or more prompts 232 in a set of commands, e.g., directive instructions to complete a particular task corresponding with the respective sections of the generation schema 210, using a task identification engine 220. In this case, each task identified by the engine 220 for the respective section can be included in a separate prompt, e.g., for the input for the respective section. As an example, the task identification engine 220 can determine one or more tasks for each section of the generation schema 210 from the TED request 120, and generate one or more prompt(s) 232 corresponding with each task. As another example, the engine 220 can process the TED request 120, decompose the TED request 120 into a set of sub-requests for each section based on the generation schema 210, and determine respective prompts 232 for each of the sub-requests.

For example, the portion of the TED request 120 corresponding with a particular section can be decomposed into one or more tasks for a particular LLM, e.g., as a sequence of prompts in a chain-of-thought framework that decomposes a complex task into a sequence of related sub-tasks that an LLM can consecutively perform to effectively complete the complex task. As another example, the portion of the TED request 120 corresponding with a particular section can be decomposed into tasks that each correspond with different finetuned LLMs, e.g., to take advantage of a mixture-of-experts model included in the external LLMs 110.

In some cases, the input 230 can additionally include one or more response template(s) 236, e.g., an example of the desired structure for the output in response to the prompt(s) 232. In this case, a user of the client device 105 can specify a particular response template 236 for a section of the TED request 120, e.g., the user can indicate that the set of text output for a particular section adheres to a certain format.

As another example, in the case that the task identification engine 220 has decomposed one or more portions of the TED request 120 into a sequence of prompts in a chain-of-thought framework, the system 100 can include respective response templates 236 for each of the prompts 232 in the sequence of prompts that facilitate the consecutive prompting of an LLM. In particular, a response template for a particular prompt in a sequence of prompts can include a rephrasing of the prompt, a main response, a summary of the response, and suggested next steps with respect to how the prompt relates to the response.

For example, the subsystem 200 can receive the response template(s) 236 from the client device 105, e.g., by way of the API 115. In particular, the system 100 can provide an API 115 that allows for the configuration of a response template 236 for one or more portions, e.g., sections, of the TED request 120.

As another example, the subsystem 200 can identify one or more response template(s) 236, e.g., from previously used response template(s) maintained in a response template database 240. More specifically, the subsystem 200 can store previously received response templates with associated data indicating the purpose of the template in the database 240. In some cases, the subsystem 200 can use the LLMs 110 to generate response templates, e.g., by prompting one or more of the LLMs 110 to generate a response template for a given prompt, and storing the response templates in the database 240.

After assembling the generation schema 210, prompt(s) 232, and response template(s) 156 in accordance with a particular section of the generation schema 210 as the input 230, the subsystem 200 can identify relevant context 234 for the particular section. More specifically, the input 232 can include context from any of the previously generated responses. In this case, the context 234 can include at least a portion of the set of text generated for the previous input 230 in the consecutive inputs. In the case that the generation schema 210 includes a section that has two or more subsections, the subsystem 200 can include any previously generated subsections in the section, any previous generated sections, or both as the context 234 for the particular subsection.

As an example, the input 230 for section B 214 can include a portion of the set of text generated for section A 212, and the input 230 for the section C 216 can include a portion of the set of text generated for section B 214 or a portion of the set of text generated for section B 214 and a portion of the set of text generated for section A 212. In this case, the input 230 for section A 212 does not include context from the previous responses, e.g., since it is the first input in the consecutive inputs. As yet another example, the input 230 for a subsection in section B 214 can include any previously generated subsections in section B 214.

After creating the input 230, the subsystem 200 can submit the input 150 to at least one of the LLMs 110, e.g., using an LLM execution engine 250. For example, the LLM execution engine 250 can include a router that routes respective jobs for the input 150, where each job includes inputting the context 214, a prompt from the prompt(s) 154, and, in some cases, a response template from the response template (s) 236 to one of the LLMs 110.

For example, the LLM execution engine 250 can identify whether any of the one or more prompt(s) in an input corresponding to a particular section or subsection can be executed in parallel, e.g., by providing independent prompt (s), e.g., with the corresponding context 234 and generation schema 210, to separate external LLMs 110. As another example, the LLM execution engine 250 can determine whether a particular LLM in the LLMs 110 is a target LLM. For example, a particular LLM can be a target LLM if it is better-suited to perform the task represented by generating a particular section or sub-section, e.g., due to the particular LLM having been specialized for the task through finetuning. In this case, the engine 250 can submit the input 230 corresponding to the particular section or sub-section to the target LLM for the specialized task.

As yet another example, the LLM execution engine 250 can designate whether any of the particular sections or sub-sections should be generated by multiple LLMs. As an example, the subsystem 150 can submit an additional input to the multiple LLMs to indicate that the LLM is part of a multiple-participant processing job for the input 230 and to request that each of the multiple LLMs additionally process the generated section or sub-section from all of the participating LLMs in the multiple-participant processing job to generate an indication of the value of the set of text generated as an output, e.g., by voting on a best output or assigning a score to the outputs. As another example, the subsystem 200 can select the response in accordance with criteria, e.g., specified by the client device 105, for the particular section or subsection.

In particular, at each iteration for generating each of the sections or subsections, the subsystem 200 can complete a feedback loop by identifying an indication of a failed execution. More specifically, the iterative response generation subsystem 200 creates an input 230 for each of the sections and subsections specified in the generation schema 210. The subsystem 200 then submits a particular input 230 to the LLMs 110 using the LLM execution engine 250, and receives, as output, a set of text as the response to the input. The subsystem 200 can then verify whether the section or subsection corresponding with the input 230 was completed based on the generation schema 210, e.g., by processing the set of text using a verification engine 260, before submitting the next input in the consecutive inputs to the LLMs 110.

In the case that the section or subsection is considered complete, e.g., and that the execution of the corresponding section or subsection succeeded in accordance with the specification provided by the generation schema 210, the subsystem 200 can generate and maintain an aggregate TED state, e.g., the TED state 275, for each section or subsection that has been generated, e.g., in a TED state database 240. In this context, a TED state 275 refers to a partially assembled TED that includes the sets of text generated for each completed input in the consecutive inputs at a particular iteration. In particular, the subsystem 200 can process the generation schema 210 and responses to the prompt(s) 232 for a particular section or subsection using a result aggregator engine 270, e.g., to synthesize the results as the set of text based on the generation schema 210.

For example, after verifying that the set of text output by the one or more LLMs was complete using the verification engine 260, the subsystem 200 can aggregate any previously generated sets of text with the set of text generated for the most recent input in the consecutive inputs using the result aggregator engine 270. The subsystem 200 can then cache and maintain the TED state 275 for the previously executed input 230 in the TED state database 240. In the case that the verification engine 260 determines that the execution of the input 230 failed, the subsystem 200 can then identify the most recent TED state for use as context 234 in a new input for the same section or subsection.

More specifically, the subsystem 200 can establish a feedback loop by determining whether an input in the consecutive inputs should be re-executed using the verification engine 260. In the case that a particular input is designated to be re-executed, the subsystem 200 can re-execute one or more prompt(s) 232 of the input 230, the whole input 230, or a modified input, as is described in more detail below. Thus, the subsystem 200 can establish a feedback loop with the LLMs in order to generate a long-form TED based on the generation schema 210, and in some cases, external feedback.

For example, the verification engine 260 can determine whether a response, e.g., a corresponding set of text, was received for each of the prompt(s) 232 in the input 230. In the case that any response is missing, the subsystem 200 can re-execute the one or more prompt(s) corresponding with the missing responses. As another example, in the case that the prompt(s) 232 were accompanied by a response template(s) 236 in the input 230, the verification engine 260 can determine whether the responses received adhere to the relevant response template(s) 236.

In some cases, the verification engine 260 can solicit feedback on the generated section or subsection. In particular, the verification engine 260 can provide each generated section or subsection, e.g., to the client device 105 or to another system, for incremental feedback. For example, the subsystem 200 can provide the generated section or subsection for display on the client device 105, e.g., by way of the API 115. In this case, the API 115 can be configured to allow for the input of a response score for multiple categories, e.g., completeness, adherence to the user's formatting preferences for the section or subsection, clarity, etc., or can be configured to allow for a short or long-form text input to the verification engine 260, e.g., so the user can specify how the section or subsection can be improved.

For example, in the case that the verification engine 260 receives a short or long-form text input identifying various aspects of the response for improvement, the verification engine 260 can process the text input, e.g., using an additional LLM, with an instruction to determine whether to regenerate the first set of text in accordance with the feedback from the client device 105. In the case that the verification engine 260 determines regeneration is necessary, the verification engine 260 can provide the feedback prompt(s) for inclusion in the input 230 for re-execution. As another example, the verification engine 260 can include the text input directly into the input 230, e.g., without further processing.

In the case that the response generated is, e.g., incomplete, did not follow the specification for the section or subsection provided by the generation schema 210, or that the verification engine 260 received feedback requiring a regeneration of the section or subsection, the subsystem 200 can re-execute the input 230, e.g., as opposed to re-executing one or more of the prompt(s) 232. More specifically, the subsystem 200 can configure the verification engine 260 to allow for the modification of generated sections, e.g., through tailored re-execution, in order to generate a TED in a single processing flow, e.g., as opposed to generating the whole TED and having to re-execute the whole TED.

In this case, the subsystem 200 can include the most recent TED state, e.g., the TED state 275, for use as context 234 in the input 230. By caching and maintaining TED states after each iteration, the system can streamline the generation of the TED by ensuring that the generation process does not need to restart in the case of a missed or incorrectly generated section or subsection, e.g., since previous TED states can be included as context 234 in inputs that need to be re-executed. In particular, the system can use the generation schema 210 to determine the relevant TED state as context for re-execution, thereby overcoming the problem of statelessness in LLMs and reducing the use of computational resources relative to an approach that does not cache TED states for potential re-use and is required to regenerate the whole TED from the beginning.

As another example, the system 100 can use the verification engine 260 to provide for workflow monitoring regarding inputted TED requests 120. For example, the verification engine 260 can log data regarding the responses received for different inputs 230. As an example, the subsystem 200 can analyze the data, e.g., to support online improvement of the system, or to provide a user of the client device 105 with information regarding which execution strategies were most effective for responding to the TED request 120.

The subsystem 200 can use the feedback loop between the verification engine 260 and output set of text for each input 230 in the consecutive inputs in order to generate a more robust tailored TED. After providing the last input in the consecutive inputs to the LLMs 110 and receiving and aggregating the corresponding output to generate the final TED state using the result aggregator 270, the subsystem 200 can provide the generated TED 160 to the client device 105, as discussed with respect to FIG. 1.

Figure 3:
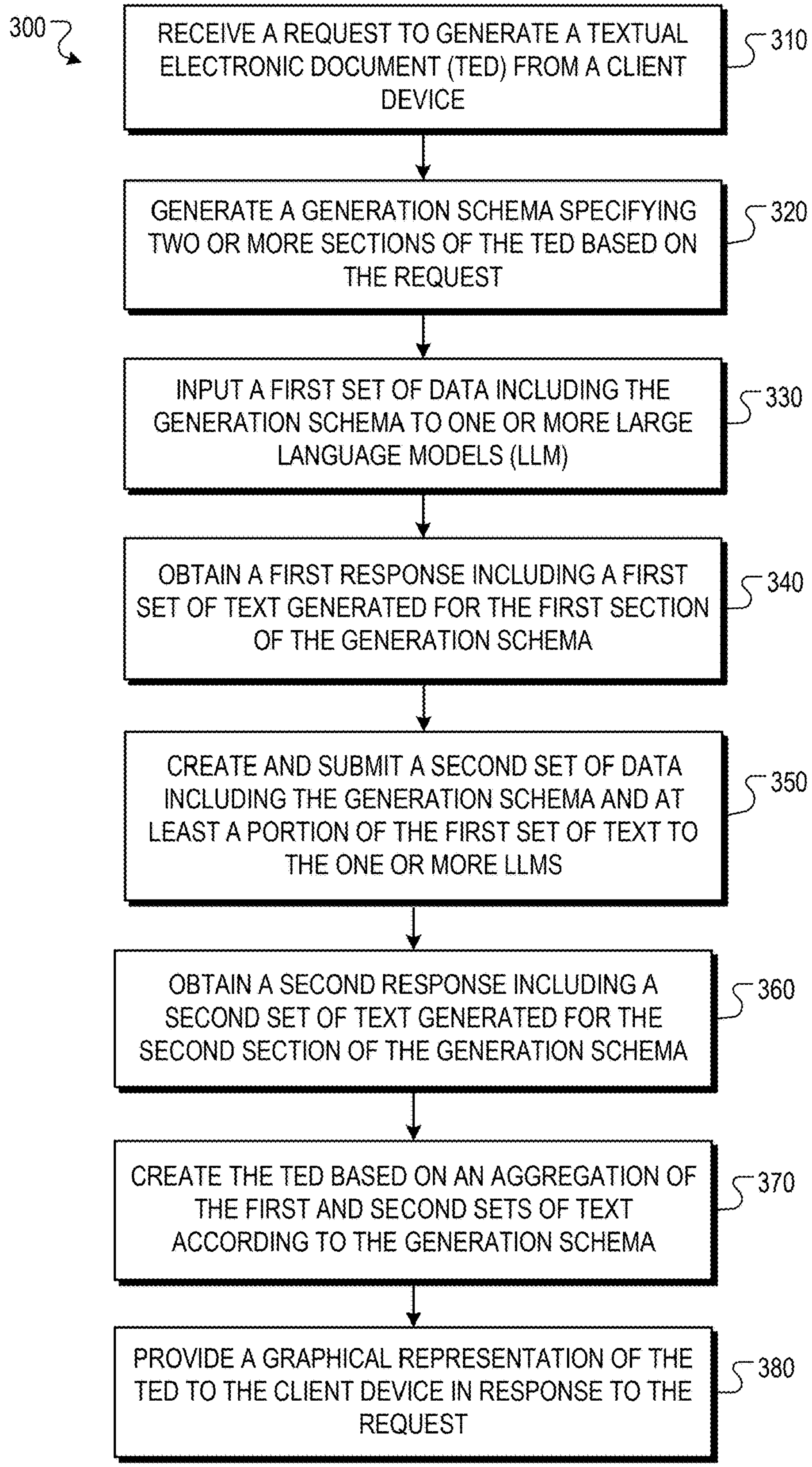
FIG. 3 is a flow diagram of an example process for generating and using a generation schema to iteratively generate different sections of a textual electronic document.

FIG. 3 is a flow diagram of an example process 300 for generating and using a generation schema to iteratively generate different sections of a textual electronic document.

For convenience, the process 300 will be described as being performed by a system of one or more computers located in one or more locations. For example, an LLM request management system, e.g., the LLM request management system 100 of FIG. 1, that is connected between a client device and one or more large language models (LLMs) and is appropriately programmed in accordance with this specification, can perform the process 300.

As previously discussed, the one or more external LLMs can each be external to the system that performs operations of the process 300. For example, any or all of the one or more external LLMs can be commercially available LLMs that are developed by third parties that differ from the entity providing the system that performs operations of the process 300. The system that performs operations of the process 300 can also include one or more LLMs.

The system can receive a request to generate a textual electronic document (TED) from a client device (step 310). For example, the textual electronic document can be a long-form text file, e.g., a contract, brief, or court case filing. As another example, the textual electronic document can be an essay, technical documentation, an annual report, or a script.

The system can generate a generation schema specifying two or more sections of the TED based on the request (step 320). In particular, the system can generate the generation schema by submitting an input including information from the request to an LLM, e.g., one of the one or more LLMs, with an instruction to generate an outline of the sections of the TED based on the request. In some cases, the input can additionally include a set of one or more example requests and corresponding TED generation schemas, e.g., to facilitate the generation of relevant generation schemas.

For example, the generation schema can specify two or more sections of the TED that will be separately generated. In some cases, at least one of the two or more sections can have two or more subsections. In particular, the generation schema can provide a roadmap that outlines the operations that need to be performed for each section of the TED. As an example, the system can generate a detailed table of contents with section headings and subheadings as the generation schema.

The system can input a first set of data including the generation schema to one or more large language models (LLMs) (step 330). For example, the first set of data can include (i) the generation schema), (ii) data from the request, and (iii) a first set of commands instructing the one or more LLMs to generate a first set of text for a first section of the generation schema of the TED based on the first set of data. In some cases, the system can select a particular LLM as a target LLM for generating the first set of text of the first section based on the first set of commands. In particular, the system can select a particular LLM that has been finetuned in accordance with a specific task to generate the first set of text in accordance with the specific task.

The system can obtain a first response to the first set of data including a first set of text generated for the first section of the generation schema of the TED (step 340). For example, the system can cache the first set of text generated for the first section of the generation schema of the TED, e.g., as a first state of the TED. In this case, the system can cache a first state of the TED generation after obtaining the first response, and can maintain the cached first state of the TED generation in data storage, e.g., a database.

As another example, the system can provide the first set of text to the client device, e.g., to obtain feedback on the first set of data. In this case, the system can determine whether to regenerate the first set of text in accordance with the feedback for the first set of text from the client device. In particular, in some cases, the system can receive different responses from each LLM among two or more LLMs, and can select a particular response from the different responses as the first response. For example, the system can select the particular response in accordance with criteria for the first section. In some cases, the system can receive the criteria as input from the client device, e.g., the criteria can be specified by the input as configuration settings for a desired clarity, organization, or tone. As another example, the system can provide the different responses to the client device, e.g., to receive an indication of the selection of the first response from the client device.

The system can then create and submit a second set of data including the generation schema and at least a portion of the first set of text to the one or more LLMs (step 350). In particular, the system can create a second set of data including (i) the generation schema, (ii) the data from the request, (iii) at least a portion of the first set of text generated for the first section of the generation schema, and (iv) a second set of commands instructing the one or more LLMs to generate a second set of text for a second section of the generation schema of the TED based on the second set of data. The system can then submit the second set of data to the one or more LLMs, e.g., as an additional input.

In the case that at least one of the sections among the two or more sections has two or more subsections, the system can create a set of commands for generating a particular subsection among the two or more subsections. In particular, the set of commands for generating the particular subsection can include a context for the particular subsection and an instruction to generate the particular subsection based on the context for the particular subsection. As an example, the context for the particular subsection can include one or more previously generated subsections in the particular subsection, previously generated sections, or both. The system can then submit the set of commands for the particular subsection to the one or more LLMs.

The system can obtain a second response to the second set of data including a second set of text generated for the second section of the generation schema of the TED (step 360). In the case that the set of commands input to the one or more LLMs was for generating a particular subsection, the system can obtain the text of the particular subsection generated based on the set of commands.

In some cases, the system can receive an indication of a failed execution of the one or more LLMs during the processing of the second set of data, e.g., in lieu of step 360. In the case that the system cached and maintained the first state of the TED generation in data storage, the system can retrieve the cached first state of the TED generation from the data storage, and can submit the cached first state of the TED generation to the one or more LLMs.

The system can create the TED based on an aggregation of the first set of text and the second set of text according to the generation schema (step 370). In particular, the system can append the second set of text to the first set of text to create the TED, e.g., the system can add the next set of text to the aggregated previous sets of text until the TED is complete according to the generation schema. The system can then provide a graphical representation of the TED to the client device in response to the request (step 380). For example, the system can provide data representing the TED to the client device for display.

Figure 4:
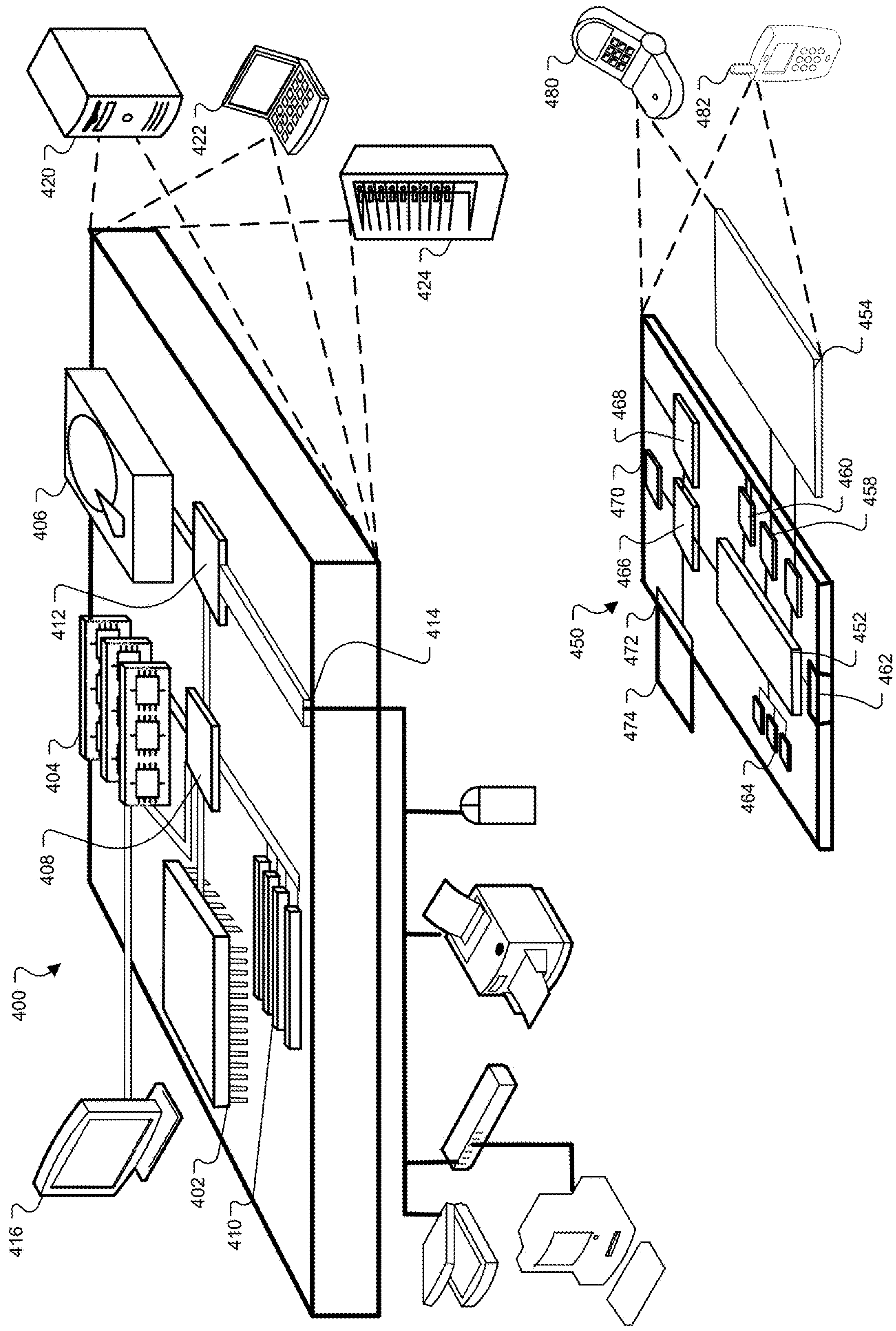
FIG. 4 illustrates an example of a computing device and a mobile computing device that can be used to implement the techniques described here.

FIG. 4 shows an example of example computer device 400 and example mobile computer device 450, which can be used to implement the techniques described herein. For example, a portion or all of the operations for transforming a textual electronic document into multiple different sub-documents, identifying one or more sub-documents in response to receiving a document analysis request, and providing the identified sub-documents as input to at least one external LLM, etc. may be executed by the computer device 400 and/or the mobile computer device 450. Computing device 400 is intended to represent various forms of digital computers, including, e.g., laptops, desktops, workstations, personal digital assistants, servers, blade servers, mainframes, and other appropriate computers. Computing device 450 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 400 includes processor 402, memory 404, storage device 406, high-speed interface 408 connecting to memory 404 and high-speed expansion ports 410, and low-speed interface 412 connecting to low-speed bus 414 and storage device 406. Each of components 402, 404, 406, 408, 410, and 412, are interconnected using various busses, and can be mounted on a common motherboard or in other manners as appropriate. Processor 402 can process instructions for execution within computing device 400, including instructions stored in memory 404 or on storage device 406 to display graphical data for a GUI on an external input/output device, including, e.g., display 416 coupled to high-speed interface 408. In other implementations, multiple processors and/or multiple busses can be used, as appropriate, along with multiple memories and types of memory. Also, multiple computing devices 400 can be connected, with each device providing portions of the necessary operations (e.g., as a server bank, a group of blade servers, or a multi-processor system).

Memory 404 stores data within computing device 400. In one implementation, memory 404 is a volatile memory unit or units. In another implementation, memory 404 is a non-volatile memory unit or units. Memory 404 also can be another form of computer-readable medium (e.g., a magnetic or optical disk. Memory 404 may be non-transitory.)

Storage device 406 is capable of providing mass storage for computing device 400. In one implementation, storage device 406 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 404, storage device 406, memory on processor 402, and the like.)

High-speed controller 408 manages bandwidth-intensive operations for computing device 400, while low-speed controller 412 manages lower bandwidth-intensive operations. Such allocation of functions is an example only. In one implementation, high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 400 can be implemented in a number of different forms, as shown in the figure. For example, it can be implemented as standard server 420, or multiple times in a group of such servers. It also can be implemented as part of rack server system 424. In addition or as an alternative, it can be implemented in a personal computer (e.g., laptop computer 422.) In some examples, components from computing device 400 can be combined with other components in a mobile device (not shown), e.g., device 450. Each of such devices can contain one or more of computing device 400, 450, and an entire system can be made up of multiple computing devices 400, 450 communicating with each other.

Computing device 450 includes processor 452, memory 464, an input/output device (e.g., display 454, communication interface 466, and transceiver 468) among other components. Device 450 also can be provided with a storage device, (e.g., a microdrive or other device) to provide additional storage. Each of components 450, 452, 464, 454, 466, and 468, are interconnected using various buses, and several of the components can be mounted on a common motherboard or in other manners as appropriate.

Processor 452 can execute instructions within computing device 450, including instructions stored in memory 464. The processor can be implemented as a chipset of chips that include separate and multiple analog and digital processors. The processor can provide, for example, for coordination of the other components of device 450, e.g., control of user interfaces, applications run by device 450, and wireless communication by device 450.

Processor 452 can communicate with a user through control interface 458 and display interface 456 coupled to display 454. Display 454 can be, for example, a TFT LCD (Thin-Film-Transistor Liquid Crystal Display) or an OLED (Organic Light Emitting Diode) display, or other appropriate display technology. Display interface 456 can comprise appropriate circuitry for driving display 454 to present graphical and other data to a user. Control interface 458 can receive commands from a user and convert them for submission to processor 452. In addition, external interface 462 can communicate with processor 442, so as to enable near area communication of device 450 with other devices. External interface 462 can provide, for example, for wired communication in some implementations, or for wireless communication in other implementations, and multiple interfaces also can be used.

Memory 464 stores data within computing device 450. Memory 464 can be implemented as one or more of a computer-readable medium or media, a volatile memory unit or units, or a non-volatile memory unit or units. Expansion memory 474 also can be provided and connected to device 450 through expansion interface 472, which can include, for example, a SIMM (Single In Line Memory Module) card interface. Such expansion memory 474 can provide extra storage space for device 450, or also can store applications or other data for device 450. Specifically, expansion memory 474 can include instructions to carry out or supplement the processes described above, and can include secure data also. Thus, for example, expansion memory 474 can be provided as a security module for device 450, and can be programmed with instructions that permit secure use of device 450. In addition, secure applications can be provided through the SIMM cards, along with additional data, (e.g., placing identifying data on the SIMM card in a non-hackable manner.)

The memory 464 can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 464, expansion memory 474, and/or memory on processor 452), which can be received, for example, over transceiver 468 or external interface 462.

Device 450 can communicate wirelessly through communication interface 466, which can include digital signal processing circuitry where necessary. Communication interface 466 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 468. In addition, short-range communication can occur, e.g., using a Bluetooth®, WiFi, or other such transceiver (not shown). In addition, GPS (Global Positioning System) receiver module 470 can provide additional navigation- and location-related wireless data to device 450, which can be used as appropriate by applications running on device 450. Sensors and modules such as cameras, microphones, compasses, accelerators (for orientation sensing), etc. may be included in the device.

Device 450 also can communicate audibly using audio codec 460, which can receive spoken data from a user and convert it to usable digital data. Audio codec 460 can likewise generate audible sound for a user, (e.g., through a speaker in a handset of device 450.) Such sound can include sound from voice telephone calls, can include recorded sound (e.g., voice messages, music files, and the like) and also can include sound generated by applications operating on device 450.

Computing device 450 can be implemented in a number of different forms, as shown in the figure. For example, it can be implemented as cellular telephone 480. It also can be implemented as part of smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method comprising:

receiving, by a system that is connected between a client device and one or more large language models (LLMs), a request to generate a textual electronic document ("TED") from a client device;

generating, based on the request, a generation schema of the TED, wherein the generation schema specifies two or more sections of the TED that will be separately generated;

inputting, by the system and to the one or more LLMs, a first set of data including (i) the generation schema, (ii) data from the request, and (iii) a first set of commands instructing the one or more LLMs to generate a first set of text for a first section of the generation schema of the TED based on the first set of data;

obtaining, by the system and from the one or more LLMs, a first response to the first set of data, wherein the first response includes the first set of text generated for the first section of the generation schema of the TED;

creating, by the system, a second set of data including (i) the generation schema, (ii) the data from the request, (iii) at least a portion of the first set of text generated for the first section of the generation schema, and (iv) a second set of commands instructing the one or more LLMs to generate a second set of text for a second section of the generation schema of the TED based on the second set of data;

submitting, by the system, the second set of data to the one or more LLMs;

obtaining, by the system, a second response to the second set of data, wherein the second response includes the second set of text generated for the second section of the generation schema of the TED;

creating, by the system, the TED based on an aggregation of the first set of text and the second text according to the generation schema; and providing, by the system, a graphical representation of the TED to the client device in response to the request.

2. The computer-implemented method of claim 1, further comprising:

caching a first state of the TED generation after obtaining the first response, wherein the cached state of the TED includes at least the first set of text; and maintaining the cached first state of the TED generation in data storage.

3. The computer-implemented method of claim 2, further comprising:

receiving an indication of a failed execution of the one or more LLMs during processing of the second set of data;

in response to the indication of failed execution, retrieving the cached first state of the TED generation from the data storage; and submitting, by the system, the cached first state of the TED generation to the one or more LLMs.

4. The computer-implemented method of claim 1, further comprising:

generating, for one of the sections among the two or more sections, two or more subsections;

creating a set of commands for generating a particular subsection among the two or more subsections based on a context for the particular subsection, wherein the context for the particular subsection comprises one or more previously generated subsections in the particular subsection;

submitting the set of commands to the one or more LLMs; and obtaining, from the one or more LLMs, text of the particular subsection generated based on the set of commands.

5. The computer-implemented method of claim 1, further comprising:

providing the first set of text to the client device;

obtaining feedback for the first set of text from the client device; and determining whether to regenerate the first set of text in accordance with the feedback for the first set of text from the client device.

6. The computer-implemented method of claim 1, wherein obtaining the first response to the first set of data comprises:

receiving different responses from each LLM among two or more LLMs; and selecting, as the first response, a particular response from the different responses in accordance with criteria for the first section.

7. The computer-implemented method of claim 6, wherein the criteria for the first section are specified by input from the client device.

8. The computer-implemented method of claim 1, further comprising selecting, for the first section, a particular LLM as a target LLM for generating the first set of text of the first section based on the first set of commands, wherein the particular LLM has been finetuned in accordance with a specific task.

9. The computer-implemented method of claim 1, wherein generating the generation schema of the TED comprises:

submitting an input comprising information from the request to an LLM with an instruction to generate an outline of the sections of the TED based on the request.

10. The computer-implemented method of claim 9, wherein the input further comprises a set of one or more example requests and corresponding TED generation schemas.

11. A system comprising one or more computers and one or more storage devices storing instructions that are operable, when executed by the one or more computers, to cause the one or more computers to perform operations comprising:

receiving, by a system that is connected between a client device and one or more large language models (LLMs), a request to generate a textual electronic document ("TED") from a client device;

generating, based on the request, a generation schema of the TED, wherein the generation schema specifies two or more sections of the TED that will be separately generated;

inputting, by the system and to the one or more LLMs, a first set of data including (i) the generation schema, (ii) data from the request, and (iii) a first set of commands instructing the one or more LLMs to generate a first set of text for a first section of the generation schema of the TED based on the first set of data;

obtaining, by the system and from the one or more LLMs, a first response to the first set of data, wherein the first response includes the first set of text generated for the first section of the generation schema of the TED;

creating, by the system, a second set of data including (i) the generation schema, (ii) the data from the request, (iii) at least a portion of the first set of text generated for the first section of the generation schema, and (iv) a second set of commands instructing the one or more LLMs to generate a second set of text for a second section of the generation schema of the TED based on the second set of data;

submitting, by the system, the second set of data to the one or more LLMs;

obtaining, by the system, a second response to the second set of data, wherein the second response includes the second set of text generated for the second section of the generation schema of the TED;

creating, by the system, the TED based on an aggregation of the first set of text and the second text according to the generation schema; and providing, by the system, a graphical representation of the TED to the client device in response to the request.

12. The system of claim 11, wherein the operations further comprise:

caching a first state of the TED generation after obtaining the first response, wherein the cached state of the TED includes at least the first set of text; and maintaining the cached first state of the TED generation in data storage.

13. The system of claim 12, wherein the operations further comprise:

receiving an indication of a failed execution of the one or more LLMs during processing of the second set of data;

in response to the indication of failed execution, retrieving the cached first state of the TED generation from the data storage; and submitting, by the system, the cached first state of the TED generation to the one or more LLMs.

14. The system of claim 11, wherein the operations further comprise:

generating, for one of the sections among the two or more sections, two or more subsections;

creating a set of commands for generating a particular subsection among the two or more subsections based on a context for the particular subsection, wherein the context for the particular subsection comprises one or more previously generated subsections in the particular subsection;

submitting the set of commands to the one or more LLMs; and obtaining, from the one or more LLMs, text of the particular subsection generated based on the set of commands.

15. The system of claim 11, wherein the operations further comprise:

selecting, for the first section, a particular LLM as a target LLM for generating the first set of text of the first section based on the first set of commands, wherein the particular LLM has been finetuned in accordance with a specific task.

16. A non-transitory computer readable storage medium encoded with a computer program, the program comprising instructions that are operable, when executed by data processing apparatus, to cause the data processing apparatus to perform operations comprising:

receiving, by a system that is connected between a client device and one or more large language models (LLMs), a request to generate a textual electronic document ("TED") from a client device;

generating, based on the request, a generation schema of the TED, wherein the generation schema specifies two or more sections of the TED that will be separately generated;

inputting, by the system and to the one or more LLMs, a first set of data including (i) the generation schema, (ii) data from the request, and (iii) a first set of commands instructing the one or more LLMs to generate a first set of text for a first section of the generation schema of the TED based on the first set of data;

obtaining, by the system and from the one or more LLMs, a first response to the first set of data, wherein the first response includes the first set of text generated for the first section of the generation schema of the TED;

creating, by the system, a second set of data including (i) the generation schema, (ii) the data from the request, (iii) at least a portion of the first set of text generated for the first section of the generation schema, and (iv) a second set of commands instructing the one or more LLMs to generate a second set of text for a second section of the generation schema of the TED based on the second set of data;

submitting, by the system, the second set of data to the one or more LLMs;

obtaining, by the system, a second response to the second set of data, wherein the second response includes the second set of text generated for the second section of the generation schema of the TED;

creating, by the system, the TED based on an aggregation of the first set of text and the second text according to the generation schema; and providing, by the system, a graphical representation of the TED to the client device in response to the request.

17. The non-transitory computer readable storage medium of claim 16, wherein the operations further comprise:

caching a first state of the TED generation after obtaining the first response, wherein the cached state of the TED includes at least the first set of text; and maintaining the cached first state of the TED generation in data storage.

18. The non-transitory computer readable storage medium of claim 17, wherein the operations further comprise:

receiving an indication of a failed execution of the one or more LLMs during processing of the second set of data;

in response to the indication of failed execution, retrieving the cached first state of the TED generation from the data storage; and submitting, by the system, the cached first state of the TED generation to the one or more LLMs.

19. The non-transitory computer readable storage medium of claim 16, wherein the operations further comprise:

generating, for one of the sections among the two or more sections, two or more subsections;

creating a set of commands for generating a particular subsection among the two or more subsections based on a context for the particular subsection, wherein the context for the particular subsection comprises one or more previously generated subsections in the particular subsection;

submitting the set of commands to the one or more LLMs; and obtaining, from the one or more LLMs, text of the particular subsection generated based on the set of commands.

20. The non-transitory computer readable storage medium of claim 16, wherein the operations further comprise:

selecting, for the first section, a particular LLM as a target LLM for generating the first set of text of the first section based on the first set of commands, wherein the particular LLM has been finetuned in accordance with a specific task.

* * * * *